Oct. 7, 1969
M. A. MORET ET AL
3,471,725
OSCILLATING ELECTRIC MOTOR
Filed March 20, 1967
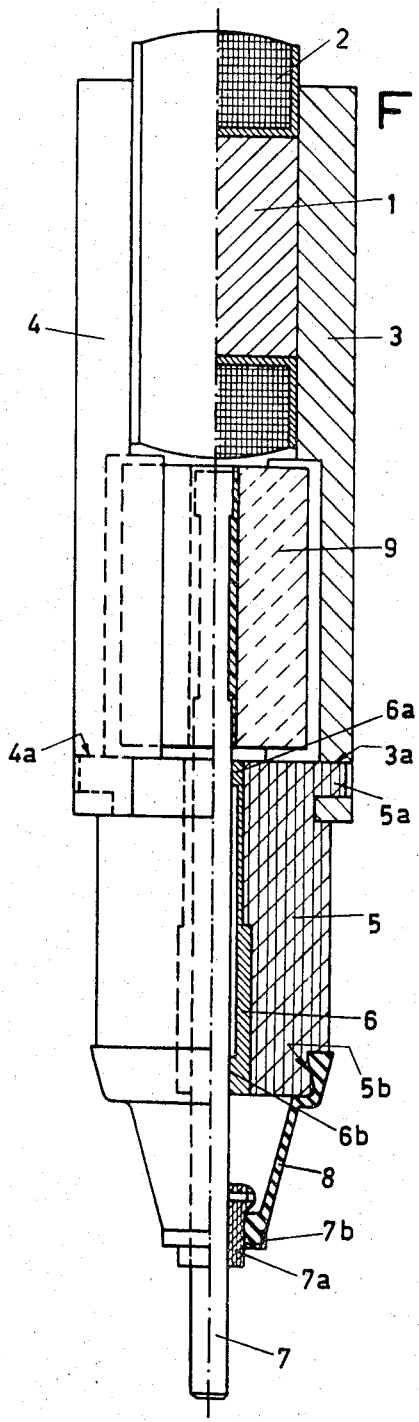
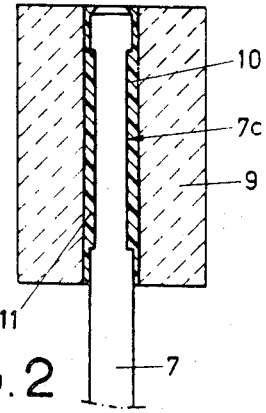
FIG.1
FIG.2
FIG.3
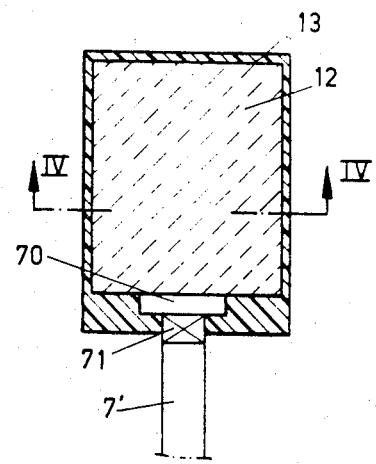
FIG.4
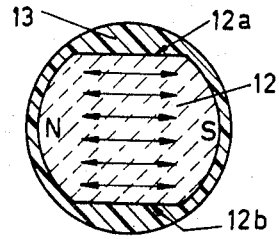
INVENTORS
MICHEL A. MORET
MARCEL FRESARD
JEAN-CLAUDE LAGIER
ATTORNEYS

United States Patent Office 3,471,725
Patented Oct. 7, 1969

3,471,725
OSCILLATING ELECTRIC MOTOR
Michel A. Moret, Marcel Fresard, and Jean-Claude Lagier, Geneva, Switzerland, assignors, by mesne assignments, to E. R. Squibb & Sons, Inc., New York, N.Y., a corporation of Delaware
Filed Mar. 20, 1967, Ser. No. 624,593
Claims priority, application Switzerland, Mar. 18, 1966, 3,966/66
Int. Cl. H02k *33/16, 35/02*
U.S. Cl. 310—36                                                        7 Claims

ABSTRACT OF THE DISCLOSURE

An oscillating electric motor has a transversely magnetized permanent magnet rotor, preferably of anisotropic ferrite material, and an AC energized electromagnetic stator. Preferably the magnet is supported by a shaft at only one end thereof. The shaft may extend through a hole in the magnet and be adhered thereto by an injected plastic, the shaft having cylindrical sections at the ends of the hole and an intermediate section of reduced cross-sectional area and non-circular. Preferably, however, an unpierced magnet is employed and is mounted on the shaft by an enlarged shaft head and a covering of plastic material which encapsulates the magnet and shaft head.

---

This invention is concerned generally with oscillating electric motor of the type having a magnetisable core surrounded by an energising coil and the rotor of which consists essentially of a strongly anisotropic material.

Already known are electric motors having a stator formed by a magnetisable core surrounded by an energising coil and by two polar members extending parallel of this core between which oscillates a rotor consisting of a metallic permanent magnet mounted on two separate shafts extending out of this magnet, one of which being pivoted in a bearing provided between the rotor and the core and the other in a second bearing positioned between the ends of the polar members on the side opposite the rotor.

Since such motors must be able to undergo slight deformation during mounting mainly in order to ensure a perfect tightness of their joints, it is impossible to adjust with precision the bores of the bearings if one wishes to avoid jamming the shafts bearing the rotor in these bearings. The play that is accordingly necessary between the shafts and the bearings results often in vibrations and in the generation of rather unpleasant noise during functioning of the motor.

Furthermore, the air space of such motors owing to the use of a permanent metallic magnet having a residual induction of the order of 12,000 gauss or more, and a coercitive field of between 550 and 750 oersteds, particularly small since it cannot exceed about 0.33 mm., a size which seriously complicates their mounting. This is in particular the case of motors intended to be placed in a housing such as an electric razor or toothbrush, mainly because of the deformation to which the parts of these motors are subjected during their insertion into the housing.

The present invention precisely has for object to avoid the disadvantages above indicated and is concerned with an oscillating electric motor the stator of which consists of a magnetisable core surrounded by an energising coil and two polar members extending parallel to said core and the rotor of which consists essentially of a permanent magnet mounted between said polar members rigidly with at least one pivoting shaft and formed of a strongly anisotropic block of ferrite.

The use of this material having a very great coercitive field permits the use of a relatively large air gap substantially equal to about 1.5 mm. while obtaining a motor couple equal to and in certain cases in excess of that developed by conventional motors having oscillating rotors.

It is moreover possible to provide such rotor with a single shaft protruding from the side opposed to the stator core and pivoted in a single bearing in such a way that this shaft can be mounted in the bearing with a minimum of play thereby appreciably reducing the generation of noise during functioning. Furthermore, the elimination of the second bearing renders possible the bringing closer of the energising coil of the rotor and eliminates the need for the cutting previously necessary in the stator members in order to fix therein this bearing.

The invention will now be described with reference to the annexed drawing which represents by way of example one embodiment thereof intended for use with an electric tooth-brush and wherein:

FIGURE 1 is a longitudinal cross-sectional view thereof;

FIGURE 2 is a cross-section of the permanent magnet rotor of FIG. 1 with the shaft extending therethrough;

FIGURE 3 is a cross-section of a preferred embodiment of the rotor; and

FIGURE 4 is a cross-section taken along line IV—IV of FIGURE 3.

The stator of the motor shown on FIGURE 1 is formed by core 1 mounted in the opening of an energising electric coil 2 and to which are attached two polar members 3 and 4 extending parallel to the axis of the rotor shaft 7.

These polar pieces have at their free end passages 3a and 4a respectively in which engage projection 5a of a tubular plastic member 5 and in which is mounted a packing 6 constituting the bearing for a shaft 7 the lower end of which when viewed in the drawing is intended to receive a tooth-brush head (not shown). This member 5 also has a switch (not shown) for controlling the motor.

On shaft 7 is mounted a socket 7a bearing a collar 7b in the opening of which is squeezed a truncated cowl 8 secured elastically in a groove 5b of member 5.

Shaft 7 resting on two parts 6a and 6b of the member 6 bears at its upper end a cylindrical block 9 constituting the rotor of the motor and formed by strongly anisotropic ferrite (FIGURES 1 and 2).

This block is pierced by an axial passage 10 having a diameter slightly greater than that of shaft 7 and the part of the latter to be introduced in this passage is cut first to form two planar surfaces 7c (FIGURE 2) diametrically opposed one to the other. The space comprised between shaft 7 and the wall of passage 10 is filled by an injected plastic mass 11 adhering perfectly to shaft 7 and to the block 9 and thereby preventing all relative movement between these two members. It will be noted in particular that the presence of two surfaces 7c adds greatly to the angular blocking of the shaft and the block 9.

Naturally the glueing of this shaft and of the block can be effected in any desired manner.

Owing to the use of a strongly anisotropic ferrite and to the characteristics of this type of magnet, the air space separating the rotor 9 from polar pieces 3 and 4 which normally is of the order of 0.2 to 0.3 mm. can be augmented to about 1.5 mm. while obtaining a couple equal and even superior to that developed by motors having a small air space. With such an air space there is additionally no tolerance or assembly problem; furthermore even in the case where some metallic dust were to be attracted by the rotor during assembly, this would not endanger the functioning of the motor, which evidently is not the case with conventional motors.

It is noteworthy to remark that the fact of providing a single bearing to support shaft 7 of the motor and disposed ahead of polar members 3 and 4 and not between these polar members as is the case with the bearings normally positioned between the rotor and the magnetisable core 1 of conventional constructions, avoids the need of making cuts into these polar members which are necessary for the securing of this rear bearing and which has for effect to decrease the section of these members in the area of cuttings while increasing in an exaggerated manner the saturation of the field in these places. This saturation required as a matter of fact an increase in the size of coil 2, which is no longer indispensable with the motor subject of the present invention.

The embodiment of the rotor shown on FIGURES 1 and 2 permits the obtaining of excellent results but certain characteristics thereof hereinafter enumerated warrant improvement:

(a) The cost of a pierced ferrite rotor is much greater than that of the identical unpierced rotor.

(b) During fabrication of such a rotor from anisotropic ferrite it is necessary in order to magnetise the same to apply thereto a directional magnetic field necessitating the use of a particularly delicate and complicated device. Additionally, owing to the anisotropy of the magnet during its sintering, there occurs a deformation of the same in particular more specifically, an ovalising of its profile, which requires rectifying in order to eliminate the excess material causing this oval shape.

(c) Various practical experiments have shown that the magnet formed of a cylindrical axially pierced block functions much less efficiently than a similar unpierced magnet.

(d) A cylindrical magnet is perfectly symmetrical since it is diametrically magnetised in a uni-directional manner; this state of affairs requires a calibrating operation during assembly of the motor in order to be sure of the correct positioning of the rotor.

The various points above-mentioned show the need for providing a rotor in which the same are not present but which retains the advantages obtainable with a rotor such as the one represented on FIGURE 2.

In the modification of the invention illustrated by FIGURES 3 and 4, the rotor of the motor consists of a strongly anisotropic ferrite block 12 also having a cylindrical form but the rounded side face of which has two diametrically opposite planar sections 12a and 12b.

The shaft 7' is secured to block 12 by a plastic casting 13, preferably made of nylon, imprisoning a head 70 and a square section 71 of shaft 7'. The enlarged head 70 of the shaft is adjacent an end face of block 12, and coaxially therewith.

The capsule or casting 13 can be made in any suitable means and preferably by injection in a suitable mold in which is previously inserted block 12 and shaft 7'.

In passing the material forming block 12 in the anisotropic direction of the ferrite, that is in the direction shown by the arrows in FIGURE 4, the lines of force of the magnet field running through this block, once magnetised, will have an orientation corresponding to that of said arrows which will permit to proceed easily to the determination of the angular position of the rotor during mounting, this determination becoming even simpler as the plastic material used for the capsule or envelope 13 is transparent or translucent.

It is also noteworthy that by the proper selection of the positioning of the planar members 12a and 12b of rotor 12 and because of the large air gap provided between the rotor and the polar members 3 and 4 of the motor, it is no longer necessary to rectify block 12 so as to eliminate excess material resulting from an ovalising of the block due to pressing.

A rotor of the construction above-described is less than half as expensive as a pierced rotor such as the one described in connection with FIGURE 2 of the drawing.

The ferrite block 12 is protected against shocks to which the plastic material enveloping it may be subjected thereby preventing its breaking or chipping.

Furthermore, if metallic dirt were to adhere on the surface of the capsule or casting 13, this can be removed easily from this surface since it is smooth while such elimination is particularly difficult in the case of the rotor of the type shown on FIGURE 2 since the surface thereof is porous.

From the foregoing disclosure, it may be observed that there has been provided a motor which efficiently fulfills the objects thereof as hereinbefore set out and which provides numerous advantages over prior art structures of its type.

What is claimed is:

1. An oscillating electric motor including
   (a) a permanent magnet rotor mounted for angular oscillation about an axis and magnetized in a direction transverse to said axis,
   (b) and an electromagnetic stator having a core and pole pieces and a coil encircling said core for A-C energization to produce oscillation of said rotor, wherein the improvement comprises
   (c) an unpierced permanent magnet for said rotor,
   (d) a shaft extending to one end of said magnet having an enlarged head adjacent the magnet,
   (e) and a covering of plastic material extending over and adhering to said shaft head, the adjacent end of the magnet, the peripheral surface of the magnet, and at least partially around the opposite end of the magnet for mounting said magnet on said shaft,
   (f) and means mounting said shaft for angular oscillation about said axis.

2. A motor according to claim 1 in which said permanent magnet rotor is of anisotropic ferrite material.

3. A motor according to claim 1 in which at least a portion of the shaft covered by said plastic material is non-circular in cross section.

4. A motor according to claim 3 in which said magnet is attached to a shaft at only one end thereof, and said covering of plastic material extends completely over the other end of the magnet to thereby encapsulate the magnet and the enlarged section of the shaft adjacent thereto.

5. A motor according to claim 4 in which said covering is injection molded around said magnet and the enlarged section of the shaft adjacent thereto.

6. An oscillating electric motor including
   (a) a permanent magnet rotor mounted for angular oscillation about an axis and magnetized in a direction transverse to said axis,
   (b) and an electromagnetic stator having a core and pole pieces and a coil encircling said core for A-C energization to produce oscillation of said rotor, wherein the improvement comprises
   (c) a cylindrical axial hole in said permanent magnet,
   (d) a shaft in said hole having cylindrical sections in said hole at respective ends of the hole and an intermediate section therebetween,
   (e) said intermediate section of the shaft being of reduced cross-sectional area and being non-circular in cross section,
   (f) plastic material filling the space between the wall of said hole and the cylindrical and intermediate sections of said shaft and adhering thereto, (g) and means mounting said shaft for angular oscillation about said axis.

7. A motor according to claim 6 in which said permanent magnet is of anisotropic ferrite material and said plastic filling is an injection molded mass.

References Cited

UNITED STATES PATENTS

| | | | |
|---|---|---|---|
| 2,917,758 | 12/1959 | Held et al. | 310—36 XR |
| 2,295,082 | 9/1942 | Jonas | 310—152 XR |
| 3,394,295 | 7/1968 | Cory | 310—156 XR |
| 3,246,187 | 4/1966 | Iemura | 310—156 |
| 2,075,710 | 3/1937 | Gaskin. | |
| 2,628,319 | 2/1953 | Vang | 310—15 |
| 2,818,517 | 12/1957 | Loosjes | 310—261 XR |
| 2,771,572 | 11/1956 | Adams | 310—36 |
| 2,961,555 | 11/1960 | Towne | 310—43 |
| 2,095,705 | 10/1937 | Kessler | 310—265 |
| 3,135,881 | 6/1964 | Fresard | 310—36 |

FOREIGN PATENTS 1,166,907  11/1958  France.

MILTON O. HIRSHFIELD, Primary Examiner

B. A. REYNOLDS, Assistant Examiner

U.S. Cl. X.R.

310—43, 50, 88, 156, 261